United States Patent [19]
Greenland

[11] Patent Number: 6,080,041
[45] Date of Patent: Jun. 27, 2000

[54] COMPACT MOTORIZED TABLE SAW

[76] Inventor: Darrell Greenland, 1650 Tenth St., Santa Monica, Calif. 90404

[21] Appl. No.: 08/906,356

[22] Filed: Aug. 5, 1997

Related U.S. Application Data

[63] Continuation-in-part of application No. 08/651,249, May 23, 1996, abandoned, and application No. 08/655,205, Jun. 7, 1996, abandoned.

[51] Int. Cl.[7] .................................................. B24B 49/00
[52] U.S. Cl. ...................... 451/11; 125/13.01; 125/13.03; 125/35; 451/411; 83/372
[58] Field of Search ................................ 83/471.2, 437.1, 83/372, 698.11, 886; 125/12, 13.01, 13.03, 35; 451/11, 393, 411, 455

[56] References Cited

U.S. PATENT DOCUMENTS

| | | |
|---|---|---|
| 1,900,553 | 3/1933 | Hamption . |
| 2,903,026 | 9/1959 | Frydenlund . |
| 3,199,554 | 8/1965 | Thedick . |
| 3,331,408 | 7/1967 | Condit . |
| 3,635,206 | 1/1972 | Harclerode . |
| 3,807,095 | 4/1974 | Harding .............................. 125/13 SS |
| 3,935,777 | 2/1976 | Bassett .................................. 83/471.3 |
| 5,010,978 | 4/1991 | Jimmerson .............................. 182/153 |

FOREIGN PATENT DOCUMENTS

| | | |
|---|---|---|
| 2 681 055 | 5/1992 | France . |
| 61-219543 | 9/1986 | Japan . |
| 62-246441 | 10/1987 | Japan . |

OTHER PUBLICATIONS

1992 Tile Product Catalog, MK, 5 pages.
Masonry Cutting Handbook, 2nd Ed., Norton Construction Products, Form: 3744, Pub. Date Jan. 1990, cover pages plus pp. 21–32, incl.
Target—1995, 7th Edition, cover page plus pp. 58 to 70, incl.
K Diamond, Price List, Effective May 1997, 2 pgs.

*Primary Examiner*—Timothy V. Eley
*Attorney, Agent, or Firm*—Cislo & Thomas LLP

[57] ABSTRACT

A saw with a compact frame that permits the cutting of large workpieces and that can be repeatedly operated repeatedly without requiring manual activation of an on/off switch. A special pivoting support arm pivots outwardly away from a motor assembly to allow the cutting of large workpieces while allowing the size of the saw to remain relatively compact and portable. An automatic power switch mechanism also is provided to automatically turn on the saw motor upon the placement of a workpiece adjacent to the saw blade. The saw table can be slid beyond the frame for the cutting of large workpieces.

20 Claims, 4 Drawing Sheets

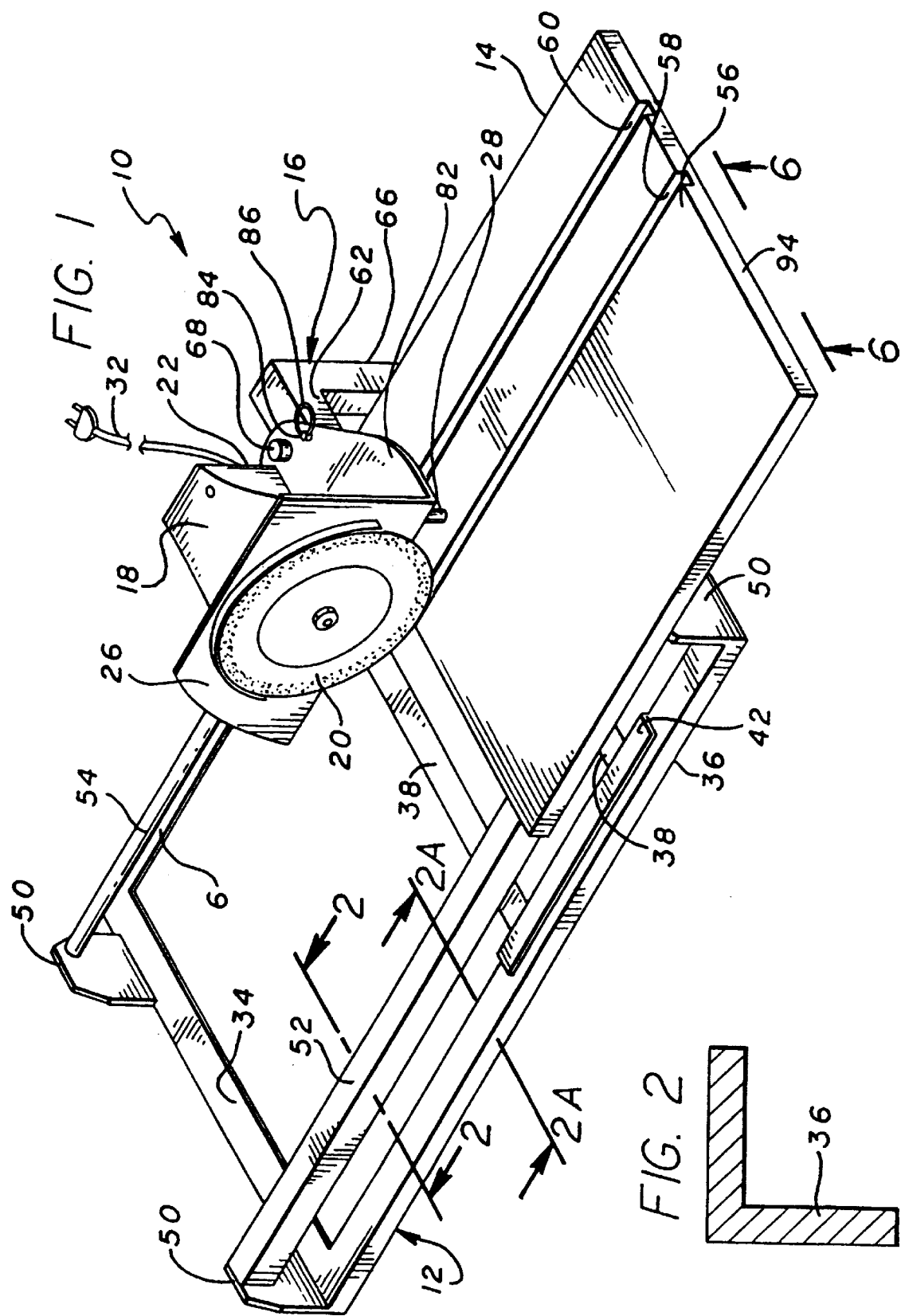

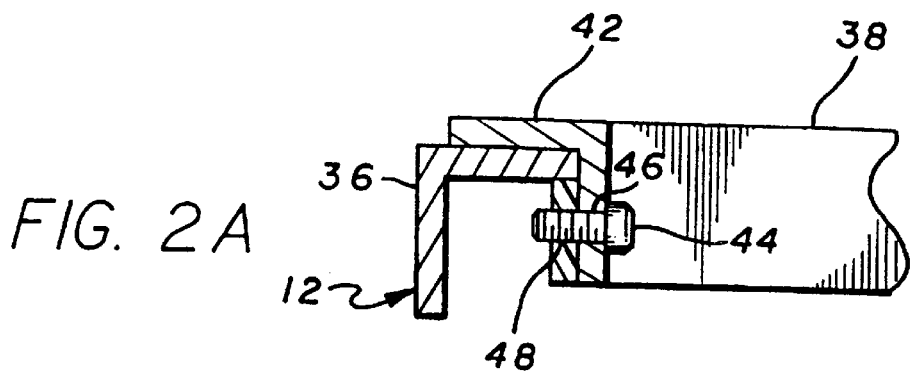
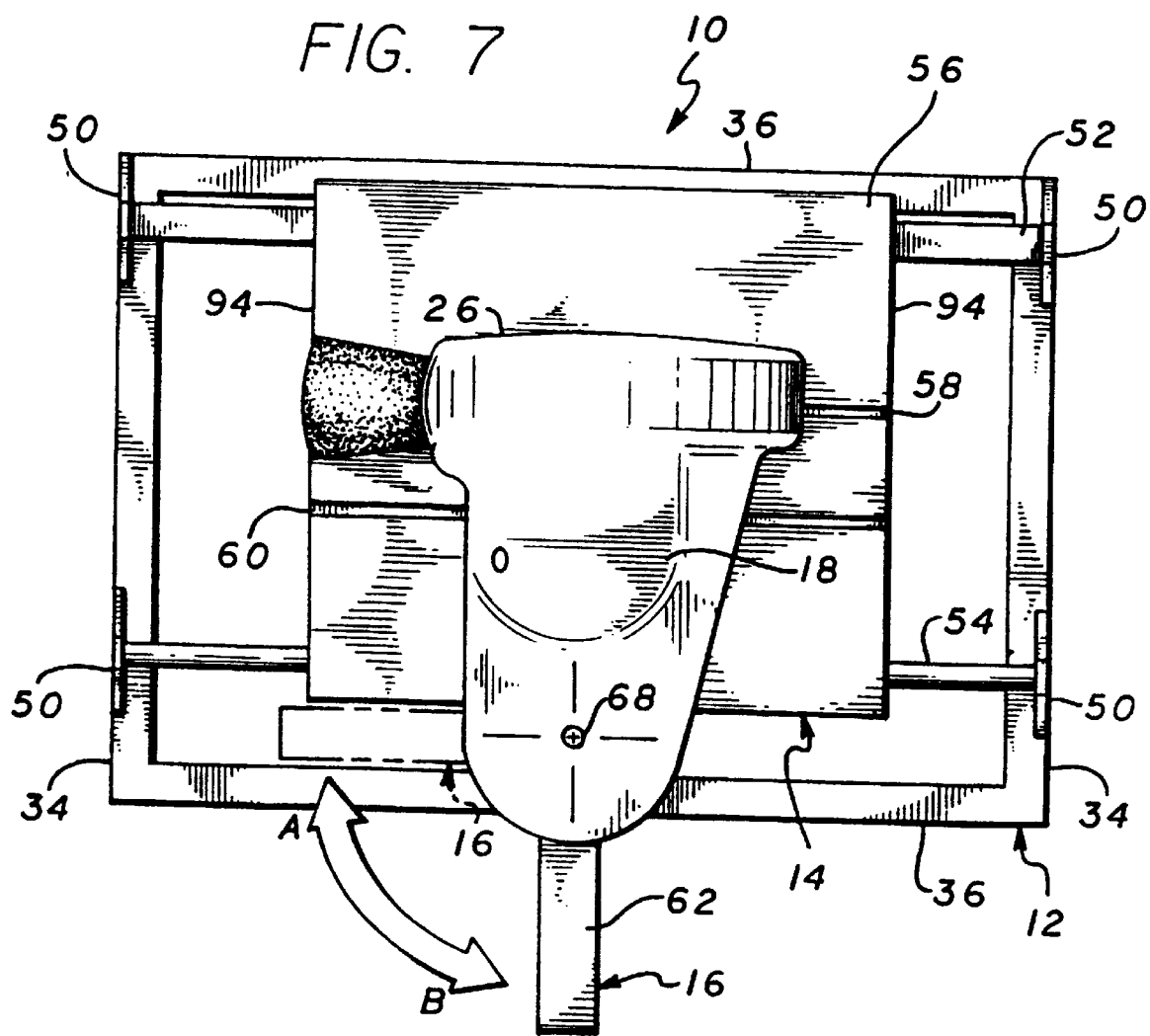

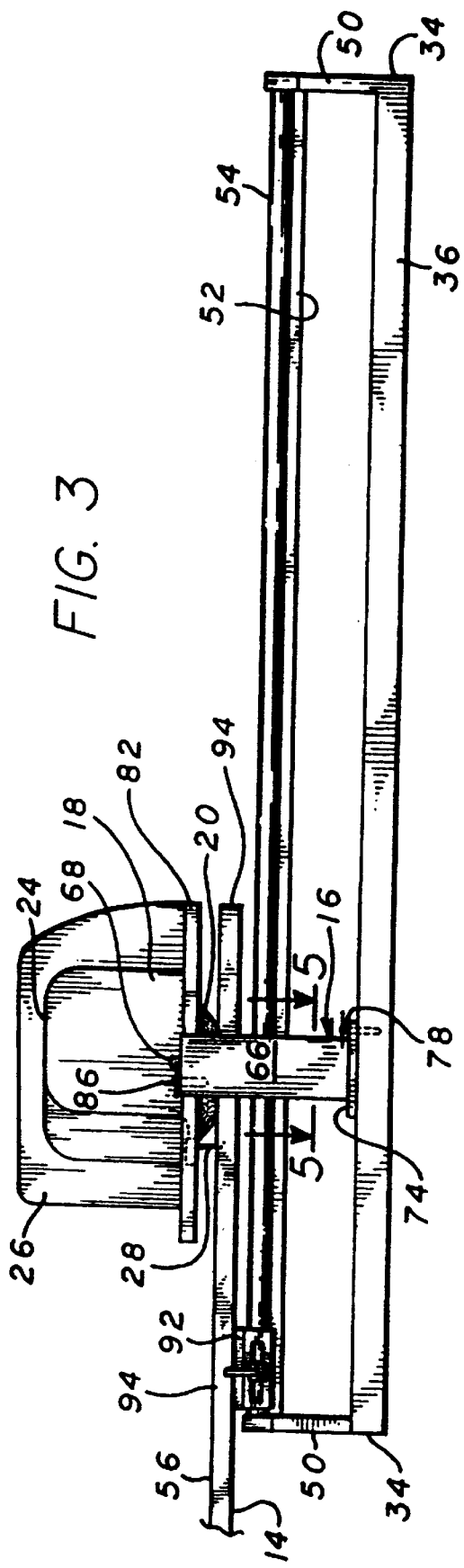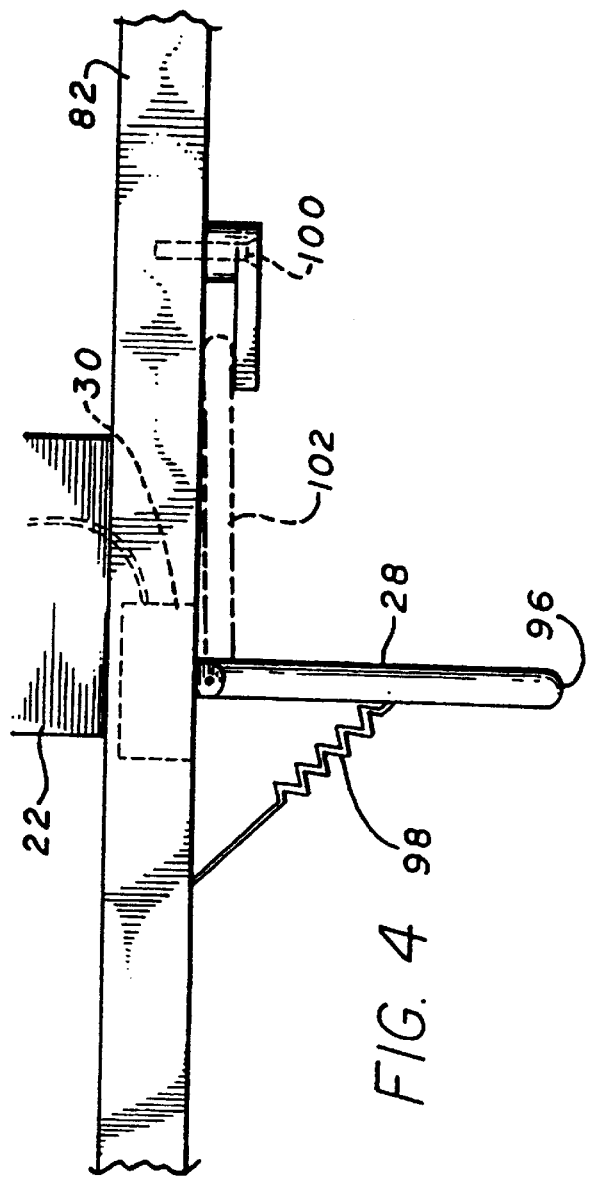

COMPACT MOTORIZED TABLE SAW

REFERENCE TO RELATED APPLICATIONS

This application is a continuation in part of application Ser. No. 08/651,249 filed May 23, 1996, and application Ser. No. 08/655,205 filed Jun. 7, 1996, both of which are now abandoned. Additionally, priority benefit under the Patent Laws is claimed with respect to pending PCT application PCT/US97/10085, filed Jun. 9, 1997 claiming a priority date of Jun. 6, 1996.

BACKGROUND OF THE INVENTION

This invention relates generally to motorized table saws and, more particularly, to portable motorized table saws for the cutting of small workpieces, such as ceramic tile and the like.

Electrically powered table saws for the cutting of small workpieces, such as tile and the like have been well known for years. It is generally desirable for tile saws to be portable so that they can be used in close proximity to the tile job, which could be in a small bathroom or kitchen. Larger tile saws that are not readily portable must be left in the back of a work truck, thereby forcing a tile worker to waste time making numerous trips between the work area and the truck to cut tiles.

One such table saw includes a motor mounted to a support arm extending upward from the edge of a structural frame with a sliding table mounted thereon. A circular blade is mounted to the motor in a position to cut workpieces on the sliding table. The reciprocating table does not extend beyond the edges of the frame. Because the cutting of ceramic tile involves the use of water as a lubricant for the saw blade, the frame of the table saw is mounted on the upper edges of a rectangular tub functioning as a catch basin for water used in the cutting process. The motor of the saw is electrically powered and has a motor switch mounted thereon that is manually activated each time a tile is to be cut.

While this table saw has proven to be generally satisfactory, it has a number of drawbacks that render it inconvenient to use and limit its ability to cut different size tile in confined spaces, such as a small bathroom or the like. Significantly, the distance between the saw blade and motor support arm limits the size of the workpiece that can be cut by the saw. Further, because the reciprocating table is limited in its travel to the ends of the frame, the saw is further limited in its ability to cut long tiles. Yet another drawback is related to the manual switch that activates the motor. Because this switch must be activated by the operator again and again as each of numerous tiles are cut, a particular job will take longer due to the cumulative time spent in activating and deactivating the switch for each tile cut.

It should, therefore, be appreciated that there is a need for a portable and compact saw that permits the cutting of large workpieces and that can be repeatedly operated without requiring manual activation of an on/off switch. The present invention fulfills this need.

SUMMARY OF THE INVENTION

The present invention provides a portable and compact saw that permits the cutting of large workpieces and that can be repeatedly operated without requiring manual activation of an on/off switch. A special pivoting support arm allows the cutting of large workpieces while allowing the size of the saw to remain relatively compact.

In particular, and for purposes of example only, the invention provides a compact saw for cutting a workpiece. The saw includes a frame, a table, a support arm and a motor assembly. The frame has at least one side edge and at least one end edge and the table is mounted to the frame to support the workpiece thereon. The table has an upper surface aligned in a predetermined plane. The support arm is mounted adjacent to the side edge of the frame and projects upwardly from the frame. The motor assembly is mounted to the support arm and includes a motor and a saw blade connected to the motor to cut the workpiece. The support arm is pivotally mounted to the frame for rotation about a first axis generally perpendicular to the plane that is aligned with the upper surface of the table.

In a more detailed aspect of the invention, the support arm pivots about the axis between a stowed position and an extended position. In the stowed position, the support arm is aligned with the side edge of the frame and, in the extended position, the arm projects away from the side edge of the frame to increase the distance between the support arm and the blade to advantageously allow cutting of larger workpieces.

More detailed aspects of the invention provide for the motor assembly to be pivotally mounted to the support arm for rotation about a second predetermined axis. This second axis can be aligned with the first predetermined axis about which the support arm pivots to enable the movement of the support arm between the extended and stowed positions without requiring the movement of the motor assembly.

Another embodiment of the invention provides for a compact saw that includes a sensor and a power switch mounted to a motor assembly. The power switch is connected to a power source and the motor, thereby allowing the sensor to activate the power switch to energize the motor assembly. In a detail of this embodiment, a sensor is an arm pivotally mounted to the power switch. The arm projects from the switch toward a predetermined location above the saw table so that movement of the workpiece toward the saw blade causes the workpiece to engage the am, thereby rotating it and activating the power switch. This automatic activation of the saw advantageously allows an operator to quickly activate the saw for repeated cutting operations.

The features described above are related to several significant advantages. In particular, because the pivoting support arm is movable between a stowed position and an extended position, the overall size of the saw is such that it can be used in confined spaces, such as small bathrooms and the like. While facilitating the compact size of the saw, the special pivoting arm advantageously pivots to its extended position to enable the saw to cut larger size tile.

Another embodiment of the invention provides a sliding carriage assembly mounted between the frame and the table for movement parallel to an edge of the frame so that the table translates to a position beyond the end of the frame for cutting of a larger workpiece. This sliding table contributes to the compact size of the saw by advantageously traveling beyond the frame to hold and cut large workpieces when desired.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

The following drawings illustrate the preferred embodiment of the invention. In such drawings:

FIG. 1 is a perspective view of a compact tile saw according to the invention;

FIG. 2 is a cross-sectional view of the compact tile saw of FIG. 1, taken along lines 2—2;

FIG. 2A is a cross-sectional view of the compact tile saw of FIG. 1, taken along lines 2A—2A;

FIG. 3 is a rear view of the compact tile saw of FIG. 1;

FIG. 4 is detailed view of the switch lever of the compact tile saw of FIG. 1;

FIG. 7 is a plan view of the compact tile saw of FIG. 1, showing its rotating motor support arm in an extended position and showing in phantom the rotating motor support arm in a stowed position.

DESCRIPTION OF THE PREFERRED EMBODIMENT

Figure 5:
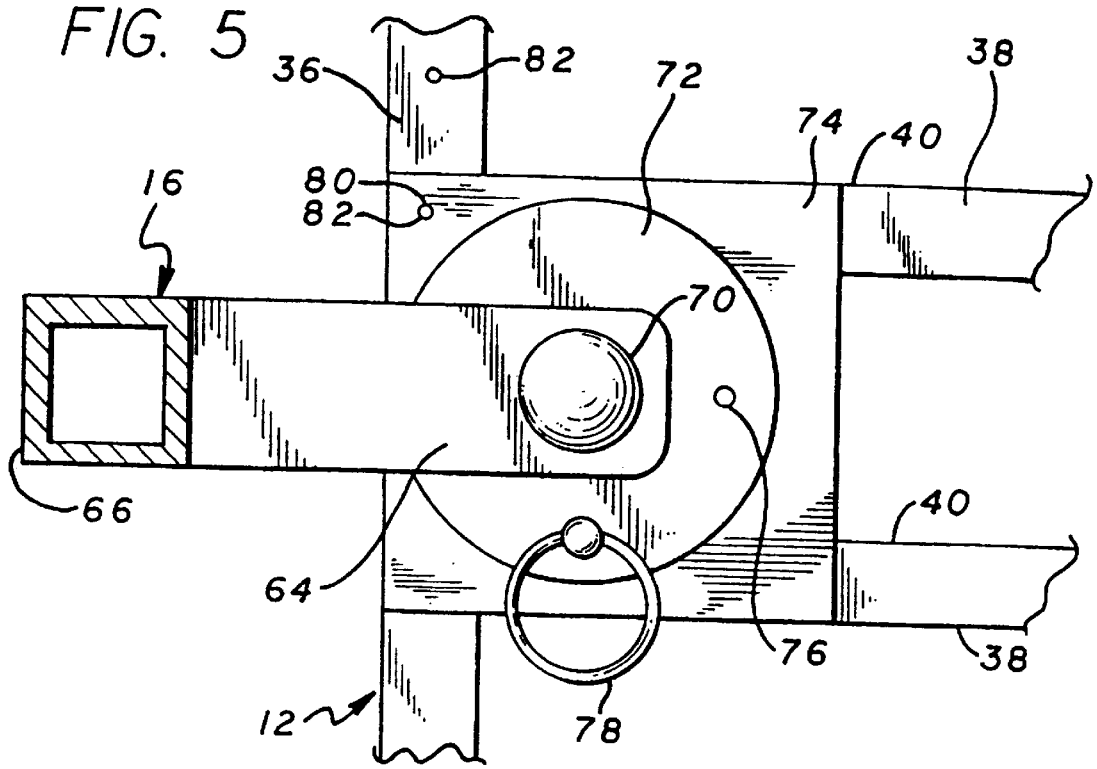
FIG. 5 is a cross-sectional view of the compact tile saw of FIG. 3, taken along lines 5—5.

With reference now to the drawings, and particularly to FIGS. 1 and 7, the invention is preferably embodied by a new and improved compact saw, generally referred to by reference numeral 10, for the cutting of workpieces such as tile and the like. The compact tile saw has a rectangular frame 12 upon which are mounted a sliding table 14 and a special pivoting support arm 16 holding a motor assembly 18 above the table.

The motor assembly 18 includes a cutting blade 20 mounted to an electric motor 22 within a housing 24. A saw blade guard 26 is located around the upper portion of the saw blade. Both the guard and the housing of the motor assembly can be made of plastic or other suitable material. The motor assembly also includes a special lever 28 mounted to a power switch 30 to automatically turn on the motor as a tile is moved toward the motor assembly 18. It should be appreciated that, for the purpose of clarity, the housing of the motor assembly is not shown in FIG. 1. A power cord 32 extends from the motor assembly to provide electric power to the motor.

As is described in more detail below, the pivoting support arm has a "U" shape and is movable between a stowed position A and an extended position B. Because of this special pivoting arm, the collective size of the saw 10 is such that it can be used in confined spaces, such as small bathrooms and the like. While facilitating the compact size of the saw, the special pivoting arm advantageously pivots to its extended position to enable the saw to cut larger size tile. Another component of the saw 10 that contributes to its compact size is the special sliding table 14, which can advantageously travel beyond the frame 12 to enable the saw to cut larger workpieces. Yet another advantage is related to the lever 28, which engages a workpiece to automatically energize the saw motor 22 as an operator moves the table holding the workpiece toward the motor.

The frame 12 and the other components of the saw are preferably formed of a rigid high strength material such as steel or other materials of similar characteristics. The frame has two end edges 34 and two longer side edges 36. A pair of braces 38 extend between the side edges of the frame to support the U-shaped support arm 16, which is mounted to the end of the braces 40 adjacent to one of the side edges 36 of the frame. As is shown in FIG. 2A, to facilitate longitudinal movement of the support arm 16 and the motor assembly 18, the braces have L-shaped edges 42 that can slide along the side edges 36 of the frame 12. The motor 22 preferably is a commonly available electrically powered motor. A pin 44 mounted through aligned holes 46 and 48 in the L-shaped edge 42 of the brace and in the side edge 36 of the frame 12 can be used to lock the braces 38 in a particular position with respect to the frame 12.

A pair of brackets 50 are mounted to each end edge 34 of the frame 12 to project upwardly therefrom to support a support rail 52 and a guide rail 54, which are each fixedly connected to the brackets 50 on each end of the frame by welded seams or other suitable mechanical connections. As shown in FIG. 2, the support rail 52 is preferably made of angle iron. The support rail and the guide rail allow lateral movement of the table along their length. The table has an upper surface 56, or top side, with a pair of grooves 58, 60 extending the length of the table. The groove 58 nearest the middle of the table provides clearance for the blade 20 of the saw 10 as it cuts the tile. As is well known, the frame 12 can be mounted on a catch basin (not shown) to catch water used to lubricate the cutting process.

As is illustrated in FIGS. 1, 3 and 7, the pivoting U-shaped support arm 16, includes a horizontal upper portion 62, a horizontal lower portion 64 and a vertical portion 66 therebetween. The support arm 16 has an upper pivot pin 68 and a lower pivot pin 70, both of which are aligned along a common vertical axis. As shown in FIG. 5, the lower portion of the arm 64 has a circular pivot plate 72 with the pivot pin 70 extending therethrough to a rectangular base plate 74 welded to the ends 40 of the braces 38 adjacent to the side edge 36 of the frame 12. The base plate and the pivot plate have sets of aligned holes 76 ninety degrees apart to accept a lock pin 78 therein to lock the arm in either the stowed A or extended B positions. Like the other ends of the braces 38, the base plate rides on the side edge 36 of the fame 12 to allow lateral movement of the arm 16 and motor assembly 18 with respect to the frame. In this regard, a frame pin 80 mounts in another hole in the base plate and aligned holes 82 in the frame to lock the lateral position of the support arm and motor assembly. The arm 16 is preferably made of steel tubing that has a square cross section.

The upper pivot pin 68 extends upward from the upper portion 62 of the support arm 16 to mount to an oblong motor support 82 that is part of the motor assembly 18. Aligned holes 84 in the motor support and the upper portion of the support arm cooperate with another lock pin 86 to lock the motor 22 in a position so that the saw blade 20 is aligned with the middle grove 58 in the table 14. This particular arrangement advantageously allows the motor assembly 18 to remain in the same position while the support arm 16 is in either of its extended 13 or stowed A positions.

The above arrangement advantageously allows the compact tile saw 10 to have a compact size because of its ability to cut small tiles can be cut while the support arm 16 is in the stowed position A. Further, despite its compact size, the tile saw can cut larger tiles with its rotating support arm in its extended position B. In particular, the saw can cut such larger tiles because the distance between the saw blade 20 and the vertical portion 66 of the support arm 16 is greater when the support arm is pivoted to its extended position B.

Figure 6:
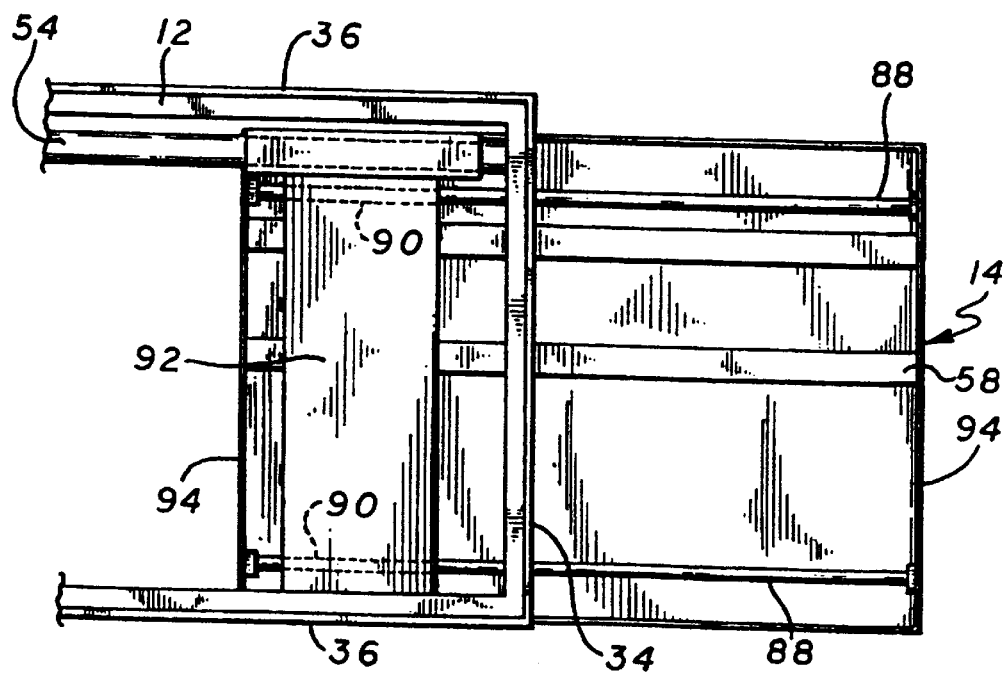
FIG. 6 is bottom view of the table and carriage of the compact tile saw of FIG 1.

As illustrated in FIG. 6, the table of the compact tile saw 10 has a pair of telescoping extension rails 88 that slide through holes 90 in a carriage 92 mounted under the table 14. The table has end edges 94 that extend downwardly. The telescoping rails 88 are mounted between each end edge of the table and are in a position that is parallel to the side edges 36 of the frame 12. The carriage slides on the guide rail 54 and the support rail 56 of the frame, thus providing two degrees of movement for the table 14. In particular, as the table is moved laterally, the carriage 92 slides to the end 34 of the frame 12. However, because of the telescoping rails 88, the movement of the table is advantageously not limited by the distance in which the carriage can move on the frame. Instead, when the carriage 92 reaches the end of the frame, the table can slide yet further because the telescoping rails 88 move within the holes 90 in the carriage to permit further lateral movement of the table beyond both ends of the frame 34. Such an arrangement can allow yet larger tiles to be cut without increasing the size of the frame of the compact tile saw 10. The table can be locked to the center of the carriage by a lock button 94 for the cutting of small tiles. When the lock button is released, the above-identified further movement of the table is accomplished.

Lastly, the automatic operation of the preferred tile saw 10 will be described. As shown in FIG. 4, the elongated switch lever 28 is pivotably mounted to a power switch 30 mounted to the motor assembly 18 near the front of the saw blade guard 26. The switch lever projects downwardly from the saw blade guard toward the table 14. The end of the switch lever 96 is positioned to engage a tile that is advanced toward the blade 20 by moving the table 14. When the tile hits the switch lever 28, it rotates and activates the power switch 30, thereby automatically turning the saw 10 on upon the approach of the tile. A spring 98 mounted between the motor assembly 18 and the switch lever 26 biases the switch lever toward its downward position so that the lever snaps back after the tile has been cut, thereby turning the off the saw motor 22. If manual operation is required, the lever 28 may be placed in a latch 100 that holds the lever in a retracted position 102. When the lever 28 is in such a retracted position the motor 22 is left on for operation by a main power switch 30. It should be appreciated that other sensors could be used to automatically activate the saw motor upon the approach of a tile. The switch lever can have a curved leading edge 96 to smoothly engage the oncoming tile.

While a particular form of the invention has been illustrated and described, it will be apparent that various modifications can be made without departing from the spirit and scope of the invention. Accordingly, it is not intended that the invention be limited, except as by the appended claims.

I claim:

1. A saw support for cutting a workpiece, comprising:
   a frame having at least one side edge and at least one end edge;
   a supported table slidably mounted to a free sliding supported carriage assembly mounted on said frame, said table being adapted to support the workpiece thereon, the table having an upper surface aligned in a predetermined plane;
   a motor assembly operatively supported by said frame including a motor and a saw blade connected to the motor to cut the workpiece; and
   said free sliding carriage assembly being mounted for movement parallel to the edge of the frame for cutting of the workpiece such that said table and free sliding carriage are moveable to a predetermined position beyond at least one end of said frame.

2. A saw support for cutting a workpiece, comprising:
   a frame having at least one side edge and at least one end edge;
   a table mounted to the frame to support the workpiece thereon, the table having an upper surface aligned in a predetermined plane;
   a motor assembly operatively supported by said frame including a motor and a saw blade connected to the motor to cut the workpiece;
   a free sliding carriage assembly mounted between the frame and said table for movement parallel to the edge of the frame for cutting the workpiece such that said table is moveable to a predetermined position beyond the end of the frame, said carriage assembly having at least one guide rail mounted to the frame in a position parallel to the edge of the frame and at least one extension rail slidably mounted to the guide rail and fixedly mounted to said table.

3. A compact saw for cutting a workpiece, the compact saw comprising:
   a frame having at least one side edge and at least one end edge;
   a table mounted to the frame to support the workpiece thereon, the table having an upper surface aligned in a predetermined plane;
   a support arm mounted adjacent to the side edge of the frame and projecting upwardly from the frame; and
   a motor assembly mounted to the support arm, the motor assembly including a motor and a saw blade for cutting the workpiece,
   wherein the support arm is pivotally mounted to the frame for rotation about a first axis generally perpendicular to the plane of the upper surface of the table and wherein the motor assembly also is pivotally mounted to the support arm for rotation about a second predetermined axis.

4. A compact saw as defined in claim 3, wherein the support arm pivots about the axis between a stowed position and an extended position, wherein in the stowed position the support arm being aligned with the side edge of the frame and in the extended position the arm projecting away from the side edge of the frame to increase the space between the support arm and the blade to allow cutting of larger workpieces.

5. A compact saw as defined in claim 4, wherein the second predetermined axis about which the motor assembly pivots is aligned with the first predetermined axis about which the support arm pivots.

6. A compact saw as defined in claim 3, further comprising a sensor and a power switch mounted to the motor assembly, the power switch being connected to a power source and the motor, wherein the sensor activates the power switch to energize the motor.

7. A compact saw as defined in claim 6, wherein the sensor is an arm pivotally mounted to the power switch, the arm projecting from the switch toward a predetermined location above the table such that upon movement of the workpiece toward the saw blade, the workpiece engages the arm, thereby rotating the arm and activating the power switch.

8. A compact saw as defined in claim 7, further comprising a spring mounted between the arm and the motor assembly to bias the arm toward the predetermined location above the table.

9. A compact saw as defined in claim 7, wherein the arm can pivot into a retracted position whereby the arm does not contact the workpiece as it approaches the saw blade.

10. A compact saw as defined in claim 3, further comprising a sliding carriage assembly mounted between the frame and the table for movement parallel to the edge of the frame for cutting of the workpiece such that the table translates to a position beyond the end of the frame.

11. A compact saw as defined in claim 10, wherein the carriage comprises:
- a first one guide rail mounted to the frame in a position parallel to the edge of the frame; and
- a carriage mounted to the table of the saw, the carriage adapted to slide upon the guide rail to thereby move the table.

12. A compact saw as defined in claim 11, wherein the carriage is slidably mounted to the table of the saw, the table including a first extension rail for which the carriage is adapted to slide along.

13. A compact saw as defined in claim 11, further comprising:
- a second guide rail mounted to the frame in a position parallel to the edge of the frame and spaced apart from the first guide rail; wherein the carriage also is adapted to slide upon the second guide rail to thereby move the table.

14. A compact saw for cutting a workpiece, comprising:
- a frame having at least one side edge and at least one end edge;
- a table mounted to the frame to support the workpiece thereon, the table having an upper surface aligned in a predetermined plane;
- a support arm mounted adjacent to the side edge of the frame and projecting upwardly from the frame;
- a motor assembly mounted to the support arm, the motor assembly including a motor and a saw blade connected to the motor to cut the workpiece;
- a power switch mounted to the motor assembly, the power switch connected to a power source and the motor;
- a sensor mounted adjacent to the motor assembly to activate the power switch upon movement of the workpiece toward the saw blade, thereby energizing the motor assembly for cutting the workpiece and a sliding carriage assembly mounted between the frame and the table for movement parallel to the edge of the frame for cutting of the workpiece such that the table is moveable to a predetermined position beyond the end of the frame.

15. A compact saw as defined in claim 14, wherein the sensor is a pivoting lever arm extending from the motor assembly toward a predetermined location for engagement with the workpiece.

16. A compact saw as defined in claim 15, further comprising a spring mounted between the motor assembly and the arm to bias the arm toward the predetermined location.

17. A compact saw for cutting a workpiece, comprising:
- a frame having at least one side edge and at least one end edge;
- a table mounted to the frame to support the workpiece thereon, the table having an upper surface aligned in a predetermined plane;
- a support arm mounted adjacent to the side edge of the frame and projecting upwardly from the frame;
- a motor assembly mounted to the support arm, the motor assembly including a motor and a saw blade connected to the motor to cut the workpiece; and
- a sliding carriage assembly mounted between the frame and the table for movement parallel to the edge of the frame for cutting of the workpiece such that the table is moveable to a predetermined position beyond the end of the frame, wherein the carriage assembly comprises:
- at least one guide rail mounted to the frame in a position parallel to the edge of the frame; and
- at least one extension rail slidably mounted to the guide rail and operatively mounted to the table of the saw.

18. A saw support for cutting a workpiece; comprising:
- a frame having at least one side edge and at least one end edge;
- a table mounted to the frame to support the workpiece thereon, the table having an upper surface aligned in a predetermined plane;
- a motor assembly operatively supported by said frame including a motor and a saw blade connected to the motor to cut the workpiece; and
- a free sliding carriage assembly mounted directly on said frame and supporting said table for movement parallel to the edge of the frame for cutting of the workpiece such that said table is moveable to a predetermined position beyond the end of the frame, said frame being open and formed by spaced, rigid members.

19. A saw support as defined in claim 18, wherein the carriage assembly comprises:
- at least one guide rail mounted to the frame in a position parallel to the edge of the frame; and
- a carriage mounted to said table, the carriage adapted to freely slide upon the guide rail to thereby move said table.

20. A saw support as defined in claim 19, wherein the carriage assembly comprises:
- at least one guide rail mounted to the frame in a position parallel to the edge of the frame; and
- at least one extension rail slidably mounted to the guide rail and fixedly mounted to said table.

* * * * *